Figure 1:
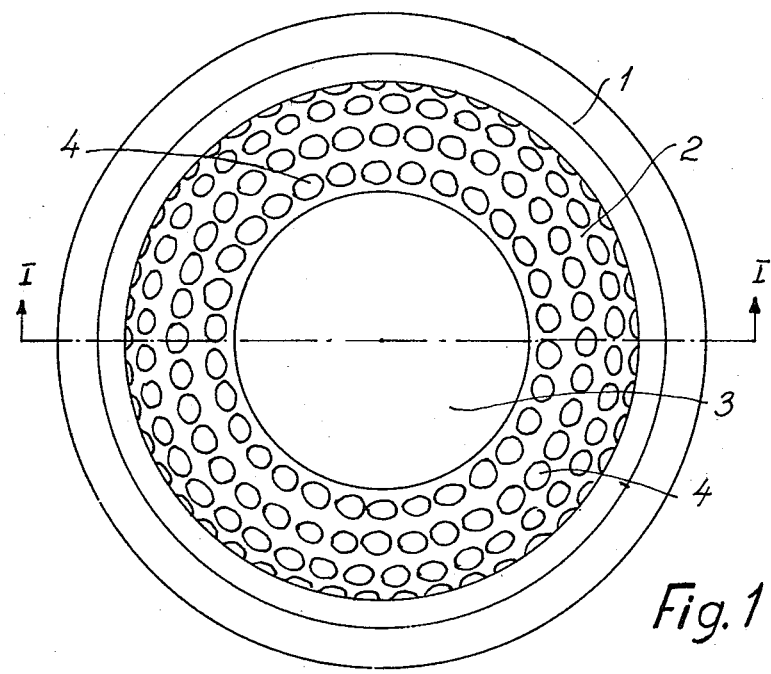

United States Patent [19]

Schreiner-Hansen

[11] 4,271,118
[45] Jun. 2, 1981

[54] METHOD OF PRODUCING A CLAY PIGEON

[76] Inventor: Ib Schreiner-Hansen, Aaso, DK-5953 Tranekaer, Denmark

[21] Appl. No.: 72,336

[22] Filed: Sep. 4, 1979

Related U.S. Application Data

[63] Continuation-in-part of Ser. No. 882,389, Mar. 1, 1978, abandoned.

[30] Foreign Application Priority Data

Jan. 3, 1978 [DK] Denmark ................. 19/78

[51] Int. Cl.³ .............................................. C04B 11/14
[52] U.S. Cl. ..................................... 264/333; 106/111
[58] Field of Search ................. 264/86, 333; 106/110, 106/111

[56] References Cited

U.S. PATENT DOCUMENTS

| | | |
|---|---|---|
| 2,016,989 | 10/1935 | D'Aragon . |
| 3,417,741 | 10/1965 | Hansen ...................... 124/8 |
| 3,621,828 | 11/1971 | Schriener-Hansen ................... 124/8 |
| 3,722,495 | 3/1973 | Schriener-Hansen ................... 124/9 |
| 3,826,238 | 7/1974 | Schriener-Hansen ................... 124/8 |
| 4,067,939 | 1/1978 | Lowe ................................ 264/333 |

FOREIGN PATENT DOCUMENTS

| | | |
|---|---|---|
| 2118047 | 4/1971 | Fed. Rep. of Germany . |
| 2100107 | 7/1972 | Fed. Rep. of Germany . |
| 1009194 | 11/1965 | United Kingdom . |
| 1077665 | 8/1967 | United Kingdom ...................... 264/333 |

Primary Examiner—John Parrish
Attorney, Agent, or Firm—Fleit & Jacobson

[57] ABSTRACT

A non-toxic clay pigeon with excellent mechanical and ballistic properties is produced by subjecting a mixture consisting essentially of plaster, an amount of water constituting a considerable amount in relation to the amount necessary for setting the plaster, calcium carbonate and optionally fly ash, and/or heavy spar; as well as one or more surfactants, organic binders, set-controlling agents and brittleness-promoting agents to compression in a clay pigeon mould heated to a temperature in the range of 100° to 160° C. such that the excess amount of water in relation to the amount necessary for setting the plaster is driven off from the mould.

13 Claims, 2 Drawing Figures

U.S. Patent    Jun. 2, 1981    4,271,118

METHOD OF PRODUCING A CLAY PIGEON

CROSS-REFERENCE TO OTHER APPLICATIONS

This application is a continuation-in-part of co-pending application Ser. No. 882,389, filed on Mar. 1, 1978, now abandoned.

The present invention relates to a method of producing a flying target of the type commonly referred to as clay pigeons. The invention also relates to a clay pigeon obtained by said method.

The known clay pigeons are usually produced from chalk mixed in phenyl-resinous bitumen. Such clay pigeons are encumbered with serious drawbacks seen from an environmental point of view since the constituent materials are not or only very slowly decomposed in the environment and furthermore are relatively toxic and can therefore be dangerous if the remains of the clay pigeons are eaten by animals, or by pollution of the soil and/or the ground water.

Moreover, the toxicity constitutes a risk to the health of those who are employed in the production of the clay pigeons. Further, the production is relatively expensive since the mixture must be melted and compressed to the desired shape under pressure, and for some time after the manufacture the clay pigeon is still rather soft and must be cooled before it can be stacked.

Finally, such clay pigeons have been found to have an inadequate form stability since for example their shape can change if they are exposed to sun light or heat for a shorter or longer period of time.

The object of the present invention is to provide a non-toxic clay pigeon that does not impair the environment and whose strength and frangibility properties are suitably adjusted to the purpose of application, and which is not encumbered with the drawbacks known from the current clay pigeons.

It has been found that this object can be achieved by the method of the invention which is characterized in that a mixture comprising plaster (hemihydrate ($CaSO_2$, $\frac{1}{2} H_2O$)), an amount of water constituting a considerable amount in relation to the amount necessary for setting the plaster, calcium carbonate and one or more of the following additives; surfactants, organic binders, release agents, set-controlling agents, and brittleness-promoting agents are subjected to compression in a clay pigeon mould heated to a temperature in the range of 100° to 160° C., such that the excess amount of water in relation to the amount necessary for setting the plaster is driven off from the mould, whereupon the clay pigeon is removed. The most suitable temperature range is 120° to 160° C., preferably 125° to 135° C.

The invention is based on the surprising recognition that by using a rather considerable amount of water in relation to the amount necessary for setting the plaster it is possible to obtain a homogeneous mixture of the constituent materials, which can easily be divided into portions of a size adjusted to the standard weight of clay pigeons, and which can very easily be transferred to moulding tools heated to a temperature in the range of 100° to 160° C. and suitably shaped to permit the driving off of the excess water during the compression, substantially in the form of steam.

By the expression "a considerable amount" is understood an excess amount considerably exceeding the usual dosing inaccuracy when mixing such starting materials. Preferably, at least 100% by weight excess is used in relation to the amount necessary for the setting, particularly 100 to 200% by weight, preferably 120 to 130% by weight.

As 100 g of $CaSO_4$, $\frac{1}{2} H_2O$ requires 18.6 g of water for the setting under formation of $CaSO_4$, $2H_2O$, the amount of water then preferably constitutes at least 37% by weight of the amount of plaster, particularly 37 to 56%, preferably about 41 to 44% of weight.

The French Pat. No. 1 345 259, German Pat. No. 812 414 and German Auslegeschrift No. 1 001 174 teach the application of plaster especially in the form of anhydrite in a mixture with various other substances where the plaster is set or in respect of the anhydrite is recrystallized in the presence of water or steam, to produce various moulded products, particularly building materials.

Also British patent specifications Nos. 1,015,331 and 1,077,665 and U.S. Pat. No. 4,067,939 disclose plaster containing mixtures suitable for obtaining building materials with good weather resistance and high strength.

None of these publications mention clay pigeons, and as a matter of fact they emphasize that the products achieved show an improved mechanical strength over similar mixtures. As regards clay pigeons it is, as mentioned, inter alia a problem imparting to the clay pigeons a too great mechanical strength, and the mixtures set forth in these publications would thus a priori be regarded as unsuitable for manufacturing clay pigeons, and also their compositions and manufacture deviate from those of the invention.

The mixture used may comprise about 35 to 55%, preferably 35 to 45%, most preferably about 40% by weight of plaster, an amount of water constituting a considerable amount in relation to the amount necessary for setting the plaster, about 1 to 45% by weight of calcium carbonate, preferably about 35 to 45%, most preferably about 40% and a total of about 1.5 to 5% by weight of the following additives: surfactants, organic binders, releasing agents, set-controlling agents and brittleness-promoting agents. Different types of calcium carbonate may be used alone or in admixture dependent on their fineness and density. A preferred combination is marble flour and chalk, but also other types, such as lime or calcspar may be used, provided they are ground to a sufficient fineness.

Another applicable constituent is heavy spar, which may be used in an amount of up to about 30%, such as 20 to 30%, e.g. about 25%. Also smaller amounts such as 10 to 20%, e.g. about 15% may be used. However, heavy spar, besides being relatively expensive as compared to plaster and many types of calcium carbonate, e.g. chalk, is slightly decomposable, although being non-toxic. Therefore, heavy spar is preferably omitted, and calcium carbonate is used instead.

A further applicable constituent is fly ash. Due to its often high content of $SiO_2$ fly ash might wear the mould. Therefore, fly ash is preferably used in very small amounts, such as 1 to 5%, e.g. 3 to 40%, or most preferably omitted.

A great measure of certainty if imparting to the pigeon such a frangibility that it will be broken by quite few pellets and that nevertheless is strong enough to withstand the ejection is achieved with a mixture comprising about 45 to 55% by weight of plaster, an amount of water constituting a considerable amount in relation to the amount necessary for setting the plaster, 1 to 5% by weight of fly ash and a total of up to about 5% by weight of the following additives: surfactants, organic binders, set-controlling agents and brittleness-promoting agents and furthermore about 1 to 5% by weight of calcium carbonate and about 20 to 30% by weight of heavy spar (baryte, BaSO$_4$).

This composition can advantageously be mixed by dissolving or suspending the additives in water, whereupon heavy-spar, fly ash and chalk are admixed while stirring with a subsequent addition of plaster.

A typical mixture which has given good results up to now comprises about 50% by weight of plaster, about 20% by weight of water, about 3% by weight of fly ash, about 25% by weight of heavy spar, about 3% by weight of chalk and a total of about 3% by weight of the additives mentioned, the relative weight ratio of the latter being approximately 15:10:0.5:3.

However, for reasons stated above heavy spar and fly ash are preferably omitted, the preferred mixture being about 40% by weight of plaster, about 40% by weight of calcium carbonate, e.g. marble flour or a mixture of 30 to 35% by weight of marble flour and 10 to 5% by weight of chalk, preferably about 32% by weight of marble flour and about 8% of chalk.

The method of the invention can be carried out at pressures from about 60 to 200 kg/cm$^2$, preferably 60 to 100 kg/cm$^2$, the most preferred pressure being 75 kg/cm$^2$, and at very short periods of processing in the range of from 0.3 seconds and up to a few, for example 2 seconds.

The clay pigeon produced by the method of the invention has an extremely stable shape immediately after the production and may be stacked almost immediately.

In immediate continuation of the shaping the pigeon may be painted in a desired non-toxic colour, for example white or yellow, preferably while the pigeon is still hot because the painting makes the finished clay pigeon suitably dust-free.

As mentioned, the main components of the subject clay pigeon are the inexpensive and non-toxic materials, plaster, calcium carbonate and water and optionally also fly ash and/or heavy spar. If fly ash is used, fly ash from coal-burned power works is preferred, because fly ash from waste disposal plants may contain undesirable metals.

According to the invention small amounts of number of additives are also used, as is mentioned, to ensure a process that permits an unproblematic production with an exceptionally high output of a non-toxic product which is not detrimental to the environment and which has the properties desirable for clay pigeons, viz. a hardness adjusted so that on one hand they can withstand the mechanical impacts during transport and from the throwing apparatus used, and on the other that they are so brittle or frangible that they will break when hit by pellets.

To facilitate the mixing of the components and the removal of the clay pigeons from the moulds one or more surfactants are added, for example decomposable anionic surfactants such as alkylaryl sulfonates or fatty alcohol sulfates and/or soft soap.

Further additives are organic binders, such as bone glue, PVA-glue or corresponding non-toxic products, for example on animal or vegetable basis.

Preferably also a release agent is present to secure a quick release of the pigeon from the mould thereby to enhance the quality and production rate. As release agents may be used water-miscible, non-toxic parting fluids of different kind. The preferred release agent is glycerine.

Moreover, small amounts of set-controlling agents are added according to the invention to permit a satisfactory rate of setting, which on one hand is so slow as to make possible an intimate mixing of the starting materials and an unproblematic division into portions and transfer to the mould tools and on the other is so fast that such a mechanical strength is imparted to the clay pigeon formed, that it can be transported and, if desired, stacked or stored in any other way in continuation of the production and the optional painting.

Thus, one or more retarders of set may advantageously be added, such as citric acid, borax, or other retarders, for example keratin.

An accelerator of set is added if desired to offset the effect of the retarder. The ratio of accelerator to retarder may be determined by a skilled person by means of tests, and it will thus be possible to omit one of these two types in borderline cases.

To ensure that the finished clay pigeon is so brittle or frangible that it will easily break when hit by one or more pellets, a brittleness-promoting agent may optionally be added. Appropriate agents of this type are gypsum or alum because they contribute towards making the clay pigeon more hard and brittle and also act as accelerators.

The relative ratio of the above five types of additives may vary within the preferred range of about 1.5 to 5% by weight of the total mixture within wide limits depending upon the specific agents used, but a particularly expendient combination is achieved, as is mentioned, if their relative weight ratio in the order stated in claim 1 and above is approximately 15:4:2:0.5:0, a brittleness-promoting agent thus preferably being omitted.

The invention will be illustrated in more detail with reference to the examples below.

EXAMPLE 1

For the production of clay pigeons the following composition was used:

|  | approx. % by weight |
|---|---|
| Plaster (CaSO$_4$, $\frac{1}{2}$ H$_2$O) | 48.44 |
| Heavy spar (BaSO$_4$) | 24.29 |
| Chalk (CaCO$_3$) | 2.43 |
| Fly ash | 3.03 |
| Water | 19.13 |
| Soluble anionic surfactant (about 7% aqueous "SULFONOL") | 0.24 |
| Soft soap (43% aqueous solution) | 1.18 |
| Organic binder | 0.97 |
| Retarder (keratin) | 0.05 |
| Gypsum (CaSO$_4$, 2H$_2$O) | 0.31 |
|  | ~ 100.07 |

The additives were suspended in water, whereupon heavy spar, fly ash and chalk were admixed while stirring and finally plaster was admixed.

After the addition of plaster and the mixing a soft homogenous substance was obtained having a consistency resembling plasticine. This substance was pressed through a tube of a diameter expediently within the range of 23 to 80 mm, from which discs having a weight of about 120 g were cut. These discs were transferred to the lower portion of the moulding tool, and then compressed at a pressure of 75 to 200 kg/cm$^2$ for a period of 1 to 2 seconds to the desired shape.

The moulding tool was heated to about 130° to 160° C. and during the compression about 10 g of water escaped, substantially in the form of steam. Then the mould was opened and the clay pigeon was removed, preferably by means of discharge devices.

A clay pigeon with a stable shape and a weight of about 110 g was achieved which on standing and drying gave off a further 6 to 8 g, or so, of water whereupon it has the constant weight of about 102 to 106 g which is desirable for clay pigeons.

EXAMPLE 2

In the table below are given recipes for mixtures of raw materials used for making clay pigeons according to the invention.

The different additives were suspended in water, whereupon the calcium carbonate constituents and possibly heavy spar and fly ash were admixed while stirring and finally the plaster was admixed. The stirring was continued until a soft homogeneous mass was obtained. This substance was divided into portions of about 115 g. The portions were transferred to a clay pigeon moulding tool and compressed at a pressure of 60 to 100 kg/cm$^2$, preferably about 75 mg/cm$^2$ for a period of 0.3 to 2 seconds to the desired shape.

The moulding tool was heated to about 125° to 135° C. and during the compression about 3 to 4 g of water escaped, substantially in the form of steam. Then the mould was opened and the clay pigeon was removed.

A clay pigeon with a stable shape and a weight of about 110 to 112 g was achieved which on standing and drying gave off a further 6 to 8 g, or so, of water whereupon it has the constant weight of about 102 g which is desirable for clay pigeons.

TABLE

| Clay pigeon recipes (constituents in % by weight) | | | | | | | | | |
| --- | --- | --- | --- | --- | --- | --- | --- | --- | --- |
| Plaster | 40.08 | 48.50 | 48.43 | 40.31 | 48.66 | 48.78 | 53.91 | 53.84 | 40.24 |
| Heavy spar | — | 24.25 | 25.06 | — | 24.33 | 12.20 | — | — | — |
| Chalk | 8.02 | 2.43 | 2.42 | — | 2.43 | 14.63 | 18.87 | 18.84 | — |
| Marble flour | 32.06 | — | — | 40.31 | — | — | — | — | 40.24 |
| Fly ash | — | 3.03 | 3.03 | — | 3.65 | 3.66 | 4.31 | 4.31 | — |
| Glycerine | 0.21 | 0.19 | 0.22 | 0.11 | 0.22 | 0.22 | 0.24 | 0.30 | 0.39 |
| Surfactant (7% aqueous solution) | 0.26 | 0.24 | 0.27 | 0.37 | 0.27 | 0.27 | 0.30 | 0.37 | 0.49 |
| Soft soap | 1.28 | 1.19 | 1.32 | 1.84 | 1.33 | 1.33 | 1.47 | 1.81 | 2.38 |
| Retarder | 0.05 | 0.05 | 0.05 | 0.07 | 0.05 | 0.05 | 0.06 | 0.07 | 0.10 |
| Water | 17.64 | 19.15 | 18.72 | 16.98 | 18.57 | 18.62 | 20.57 | 20.46 | 16.16 |
| P.V.A-glue | 0.40 | 0.97 | 0.48 | — | 0.49 | 0.24 | 0.27 | — | — |
| | 100% | 100% | 100% | 99.99% | 100% | 100% | 100% | 100% | 100% |

The above examples may be employed for large-scale production and thanks to the very short separate operations the process is extremely suitable for continuous production, it being possible to produce several clay pigeons at the time by providing suitably shaped stations for the individual processing steps.

Tests with clay pigeons of the above composition have shown that when they are hit by pellets they break into pieces, which depending upon the weather, will decompose in the course of only a few days or weeks, heavy fall of rain of course accelerating the decomposition. Even though an animal eats pieces of a broken clay pigeon its health will not be affected because the components are absolutely non-toxic.

To obtain good ballistic properties and a greater measure of certainty that pellets fired against them will not glance off, the top-face of the clay pigeons may be provided with pockets, for example shaped like ball segments. This is illustrated in greater detail in the drawing in which FIG. 1 is top view of a preferred embodiment of a clay pigeon of the invention, FIG. 2 is a cross section of the clay pigeon shown in FIG. 1 and taken along the line I—I.

Figure 2:
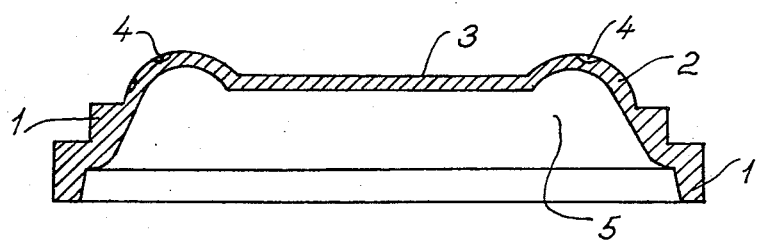

The clay pigeon shown in FIGS. 1 and 2 comprises an annular disc whose top face has a rim portion 1 with a step-shaped profile, and upwardly convex profile section 2 and a circular recessed region 3. The top face of the convex profile section 2 is provided with a great number of closely spaced pockets 4 shaped like ball sections. The underface of the clay pigeon forms a space 5. When the clay pigeon is thrown the rim portion with the step-shaped profile serves to guide the clay pigeon during its movement along the throwing arm of the trap. This throwing arm imparts to the clay pigeon a fast spinning around the centre line of the disc.

What I claim is:

1. A method of producing a clay pigeon which comprises: subjecting a mixture comprising plaster (CaSO$_4$.$\frac{1}{2}$H$_2$O), an amount of water constituting at least 100% by weight excess in relation to the amount necessary for setting the plaster, calcium carbonate and one or more additives selected from the group consisting of surfactants, organic binders, release agents, set-controlling agents, and brittleness-promoting agents to compression in a clay pigeon mould heated to a temperature in the range of 100° to 160° C. such that at least part of the excess amount of water in relation to the amount necessary for setting the plaster is driven off from the mould; and subsequently removing the clay pigeon from the mould.

2. A method according to claim 1, wherein the mixture further comprises heavy spar.

3. A method according to claim 1, wherein the mixture further comprises fly ash.

4. A method according to claim 1, wherein the mixture comprises about 35 to 55% by weight of plaster, an amount of water constituting at least 100% by weight excess in relation to the amount necessary for setting the plaster, about 1 to 45% by weight of calcium carbonate and a total of about 1.5 to 5% by weight of additives.

5. A method according to claim 1, wherein the mixture consists essentially of about 40% by weight of plaster, about 40% by weight of calcium carbonate, about 18% by weight of water, and about 2% by weight of additives, and the pressure during the compression is about 60 to 100 kg/cm$^2$, the temperature being about 125° to 135° C.

6. A method according to claim 2, wherein the mixture consists essentially of about 45 to 55% by weight of plaster, an amount of water constituting at least 100% by weight excess in relation to the amount necessary for setting the plaster, 1 to 5% by weight of calcium carbonate and a total of up to 5% by weight of the following additives: surfactants, organic binders, set-controlling agents and brittleness-promoting agents and furthermore about 1 to 5% by weight of fly ash and about 20 to 30% by weight of heavy spar.

7. A method according to claim 6, wherein the mixture is mixed by dissolving or suspending the additives in water, whereupon heavy spar, fly ash and chalk are admixed while stirring with a subsequent addition of plaster.

8. A method according to claim 6, wherein the mixture consists essentially of about 50% by weight of plaster, about 20% by weight of water, about 3% by weight of fly ash, about 25% by weight of heavy spar, about 3% by weight of chalk and a total of about 3% by weight of additives.

9. A method according to claim 6, wherein the relative weight ratio of the additives contained in the mixture is approximately 15:10:0,5:3.

10. A method according to claim 1, wherein the clay pigeon mould is of a design to produce a clay pigeon having the shape depicted in FIGS. 1 and 2.

11. A method according to claim 1, wherein the clay pigeon mould is heated to a temperature in the range of 120° to 160° C.

12. A method according to claim 1, wherein the clay pigeon mould is heated to a temperature in the range of 125° to 135° C.

13. A method according to claim 1, wherein the mixture includes an amount of water constituting 100 to 200% by weight excess in relation to the amount necessary for setting the plaster.

* * * * *